A. L. PUTNAM.
HUB ATTACHMENT MEANS FOR AUTOMOBILE DISK WHEELS.
APPLICATION FILED APR. 15, 1920. RENEWED SEPT. 13, 1922.
1,438,401. Patented Dec. 12, 1922.
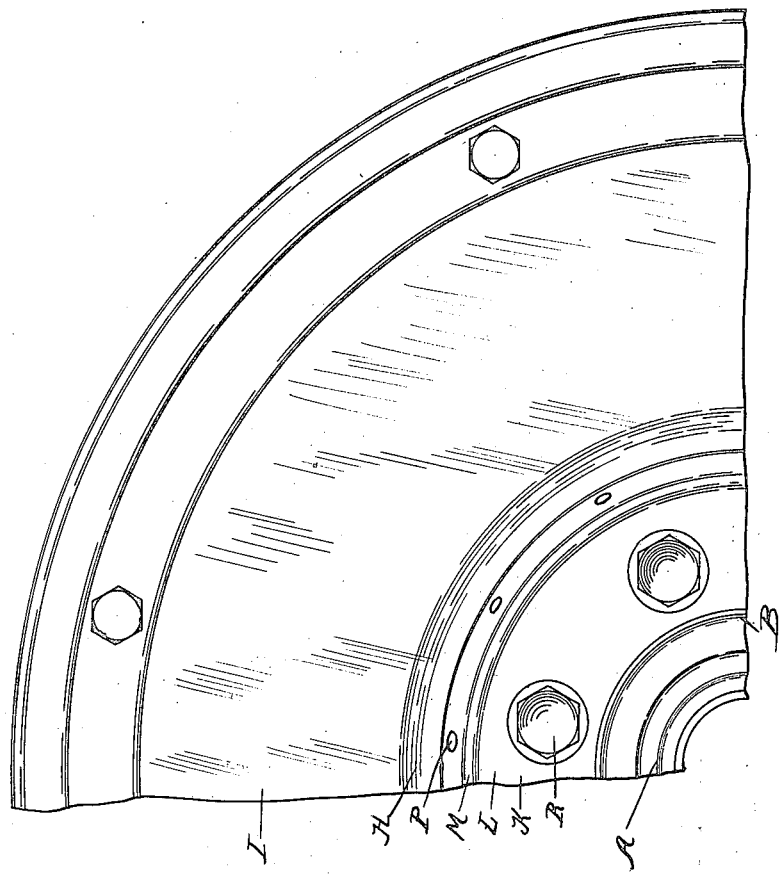
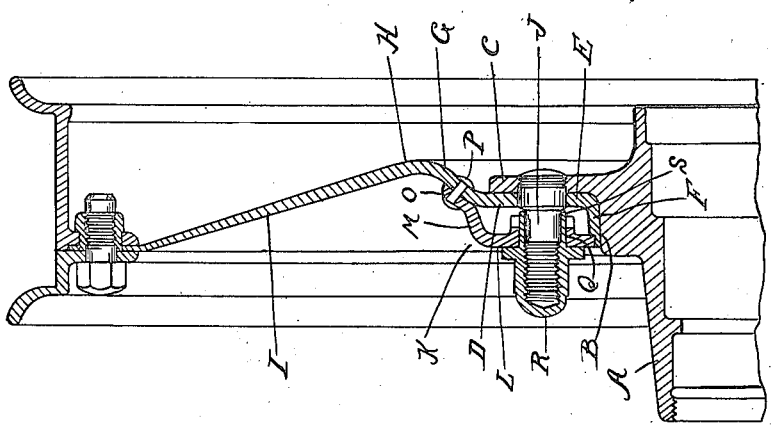
Inventor
Alden L. Putnam
By Whittemore Hulbert & Whittemore
Attorneys Patented Dec. 12, 1922.

1,438,401

UNITED STATES PATENT OFFICE.

ALDEN L. PUTNAM, OF DETROIT, MICHIGAN, ASSIGNOR TO DETROIT PRESSED STEEL COMPANY, OF WILMINGTON, DELAWARE, A CORPORATION OF DELAWARE.

HUB-ATTACHMENT MEANS FOR AUTOMOBILE DISK WHEELS.

Application filed April 15, 1920, Serial No. 374,171. Renewed September 13, 1922. Serial No. 588,083.

*To all whom it may concern:*

Be it known that I, ALDEN L. PUTNAM, a citizen of the United States of America, residing at Detroit, in the county of Wayne and State of Michigan, have invented certain new and useful Improvements in Hub-Attachment Means for Automobile Disk Wheels, of which the following is a specification, reference being had therein to the accompanying drawings.

The invention relates to demountable disk wheels of that type in which a dished disk of tapering section is peripherally secured to the wheel rim and is centrally demountably attached to the hub. It is the object of the invention to provide a construction in which a substantial bearing is provided upon the securing studs, and one in which the disk has a pleasing appearance when mounted upon the hub. To this end the invention consists in the construction as hereinafter set forth.

In the drawings:

Figure 1 is a cross-section through a portion of the wheel;

Figure 2 is an elevation thereof.

A is the wheel hub which is provided with a cylindrical portion B for the mounting of the disk thereon and a radially outwardly-extending flange C to which the disk is secured. D is a dished disk of outwardly tapering cross-section, which is formed with a portion E arranged parallel to the flange C and lying substantially in the central plane of rotation or plane of impact of the wheel. At the inner end of this portion E is a laterally outwardly extending flange F, which bears upon the cylindrical portion D of the hub. Extending radially outward from the portion D is a laterally inwardly dished portion G, terminating in a reverse bend H and a laterally outwardly-extending portion I, which at its periphery is secured to the wheel rim in a plane offset from the plane of impact.

The disk is secured to the flange C by studs J, which extend laterally outward and engage registering apertures in the portion D. To provide a substantial bearing upon these studs, an auxiliary member K is atached to the disk, this member having a portion L, which is parallel to the portion E, in a plane at the outer end of the flange F. The member is also provided with a laterally inwardly-extending portion M, terminating in the flange O parallel to the portion G and secured thereto by rivets P or other suitable means. The portion L of the member K is provided with a series of apertures registering with the stud apertures in the portion E and surrounding each of these apertures are the inturned flanges Q. These are concentric with the axis of the studs and are of an internal diameter somewhat greater than that of the studs. R are clamping nuts engaging the studs, which are provided with inwardly extending sleeve portions S insertable into the space between the studs and the flanges Q.

With the construction described, when the nuts R are screwed upon the studs into clamping engagement with the member K, the sleeve portions S thereof will form bushings between the studs and the flanges Q, thereby affording a substantial bearing.

What I claim as my invention is:

1. In a wheel, the combination with a hub having a radially outwardly-extending flange thereon and a cylindrical portion at the inner end of said flange, of a dished disk having a portion for bearing against said flange and a flanged portion for engaging said cylindrical portion, an auxiliary member secured to said disk having a portion parallel to the portion for engaging the flange of the hub and arranged at the outer end of the flange engaging said cylindrical portion, a stud projecting laterally from the flange on the hub and engaging registering apertures in said disk and auxiliary member, an inturned flange on said auxiliary member surrounding the aperture therein, and a nut for engaging said stud and clamping against said auxiliary member, said nut having a sleeved portion forming a bushing between said stud and inturned flange.

2. In a wheel, the combination with a hub provided with a radially outwardly-extending flange and a cylindrical portion at its inner end, of a dished disk mounted upon said hub having a portion parallel to said flange arranged substantially in the central plane of rotation or plane of impact of the wheel and provided at its inner end with an out-turned flange engaging the cylindrical portion of said hub, an auxiliary member secured to said disk having a portion extending parallel to said portion adjacent to said flange and in a plane at the outer end of the flange engaging the cylindrical portion of said hub, a stud projecting laterally from the flange on the hub engaging registering apertures in said disk and auxiliary portion, a nut engaging said stud having a clamping engagement with said auxiliary portion and provided with a sleeve extending inward upon said hub, and a bearing in the space between said auxiliary member and said disk concentric with said stud and with which said sleeve is engaged as a bushing.

In testimony whereof I affix my signature.

ALDEN L. PUTNAM.